(12) United States Patent
Chiou et al.

(10) Patent No.: US 7,711,476 B2
(45) Date of Patent: May 4, 2010

(54) AIDED INS/GPS/SAR NAVIGATION WITH OTHER PLATFORMS

(75) Inventors: Kuo-Liang Chiou, West Hills, CA (US); Carroll C. Chiou, West Hills, CA (US); Kevin E. Rudolph, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 842 days.

(21) Appl. No.: 11/257,235

(22) Filed: Oct. 24, 2005

(65) Prior Publication Data
US 2006/0293853 A1   Dec. 28, 2006

Related U.S. Application Data

(63) Continuation-in-part of application No. 11/159,475, filed on Jun. 23, 2005, now Pat. No. 7,395,156.

(51) Int. Cl.
G01C 21/20 (2006.01)
(52) U.S. Cl. .......................... 701/207; 701/1; 701/200; 701/225; 340/998; 340/901; 340/991; 340/995.25; 340/995.28; 342/357.14; 342/451
(58) Field of Classification Search ................. 701/207, 701/200, 225, 1; 340/988, 991, 901, 995.25, 340/995.28; 342/357.14, 451
See application file for complete search history.

(56) References Cited

U.S. PATENT DOCUMENTS 4,549,184 A * 10/1985 Boles et al. ............... 342/25 B
5,220,509 A * 6/1993 Takemura et al. ........... 701/216
5,416,712 A * 5/1995 Geier et al. ................. 701/216
5,432,520 A * 7/1995 Schneider et al. ....... 342/357.14
5,526,001 A * 6/1996 Rose et al. .................. 342/442
5,640,325 A * 6/1997 Banbrook et al. ........... 701/220
5,672,872 A * 9/1997 Wu et al. .................... 250/330
5,999,129 A * 12/1999 Rose .......................... 342/394
6,181,271 B1 * 1/2001 Hosaka et al. ................ 342/33
6,407,703 B1 * 6/2002 Minter et al. ............... 342/450
7,249,730 B1 * 7/2007 Flippen, Jr. ................ 244/3.15
7,292,935 B2 * 11/2007 Yoon .......................... 701/209

(Continued)

Primary Examiner—Khoi Tran
Assistant Examiner—Nikhil Sriraman
(74) Attorney, Agent, or Firm—Pillsbury Winthrop Shaw Pittman LLP

(57) ABSTRACT

The need for geo-registered features is avoided by a system for estimating a motion of a first sensor during a time interval. The system has a second sensor where the first sensor and the second sensor sense the same geo-location during the time interval. The first sensor computes a first target location error from sensing the geo-location. The second sensor also computes a second target location error from sensing the geo-location. A data link interconnects the first sensor and the second sensor, the data link transmitting the second target location error computed by the second sensor to the first sensor during the time interval. A processor at the first sensor combines the first target location error and the second target location error in a first sensor observation model, where the sensor observation model is descriptive of the motion of the first sensor. The observation model is used with a Kalman filter to update the position of the first sensor. This combination of the first sensor observation model and the second sensor observation model generates a more accurate target location error at the first sensor. The principle is extended to a plurality of platforms.

24 Claims, 7 Drawing Sheets

U.S. PATENT DOCUMENTS

| | | | |
|---|---|---|---|
| 7,579,989 B2* | 8/2009 | Winterling et al. | 342/450 |
| 7,626,545 B2* | 12/2009 | Smith et al. | 342/451 |
| 2004/0181335 A1* | 9/2004 | Kim et al. | 701/207 |
| 2005/0183569 A1* | 8/2005 | Solomon | 89/1.11 |
| 2006/0224309 A1* | 10/2006 | Schmidt et al. | 701/207 |
| 2006/0227664 A1* | 10/2006 | Horak | 367/136 |
| 2007/0233336 A1* | 10/2007 | Serguei et al. | 701/23 |

* cited by examiner

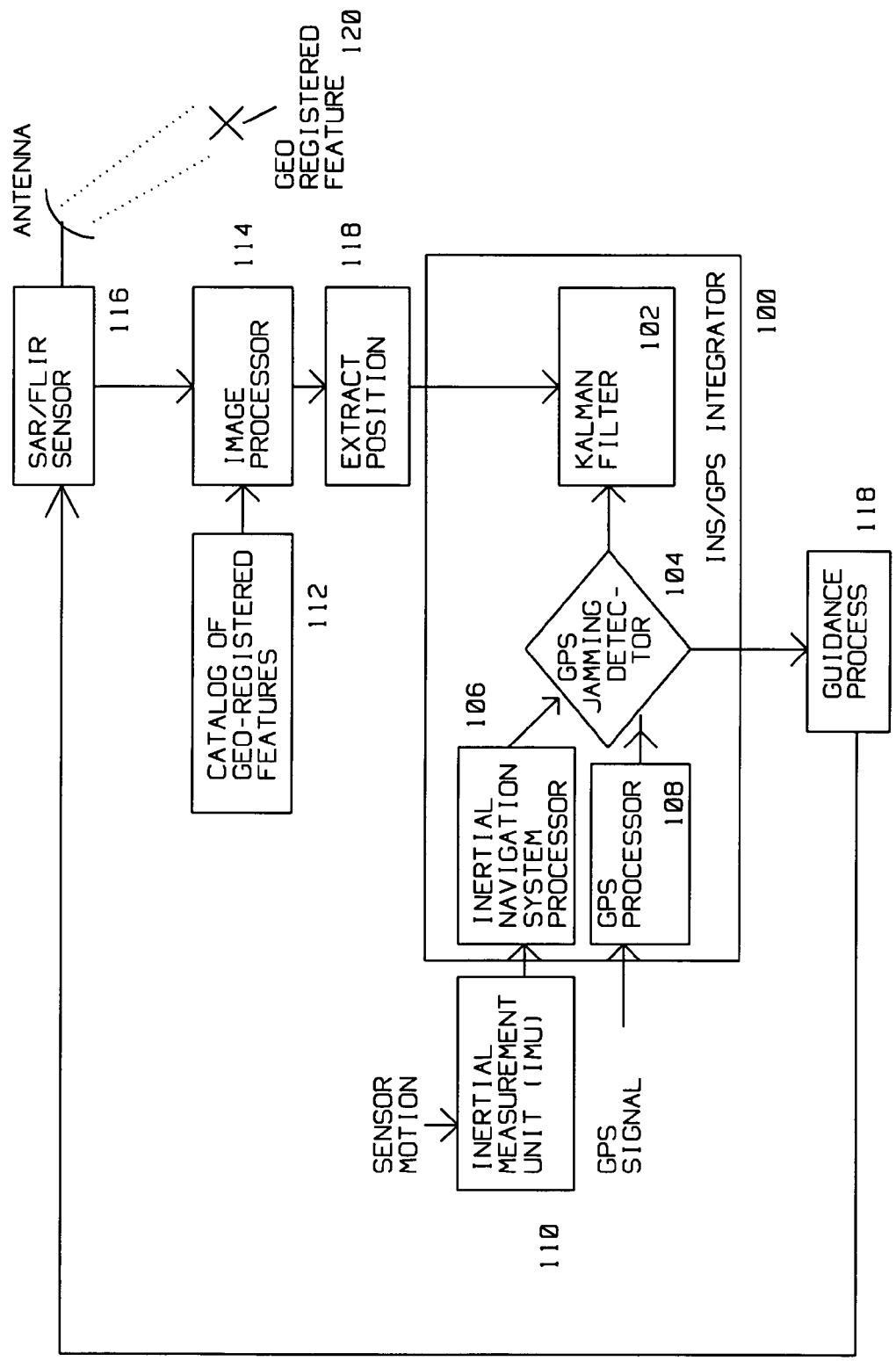
FIG 1 - PRIOR ART

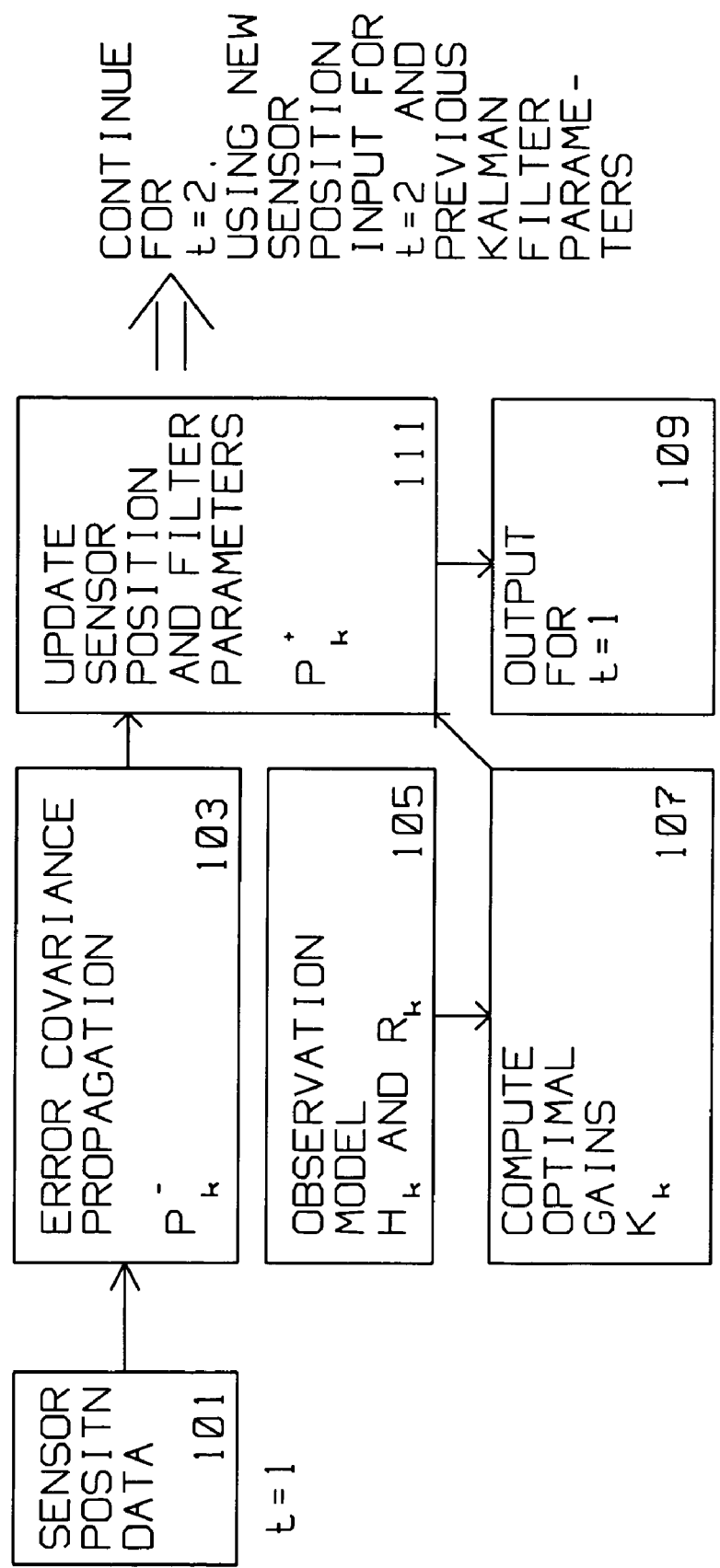
FIG 1A - PRIOR ART

AIDED INS/GPS/SAR NAVIGATION WITH OTHER PLATFORMS

This application is a continuation in part of U.S. Patent and Trademark Office application Ser. No. 11/159,475, filed Jun. 23, 2005 now U.S. Pat. No. 7,395,156.

BACKGROUND OF THE INVENTION

1. Field of the Invention

This invention is in the field of improved sensor motion (position, velocity, acceleration) accuracy during GPS unavailability using multiple sensors locating a particular geo-target in a common time frame.

2. Description of the Related Art

Synthetic Aperture Radar (SAR) is used for ground mapping as well as target identification. The general principle behind SAR is to coherently combine the amplitude and phase information of radar returns from a plurality of sequentially transmitted pulses. These pulses are from a relatively small antenna on a moving platform. As the platform moves, the information contained in the pulses is coherently combined to arrive at a high resolution SAR image.

The plurality of returns creating a SAR image generated by the transmitted pulses along a presumed known path of the platform make up an array. Theoretically, during the array, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the array.

The clarity of a SAR image is in many respects dependent on the quality of the motion compensation applied to each radar return contributing to the coherent SAR image computation. Motion compensation shifts the phase of each radar sample (typically an I+jQ complex quantity derived from an analog to digital converter) in accordance with the motion in space of the moving platform with respect to a reference point. The SAR imaging process depends on the coherent, phase accurate summing of all radar returns expected within an array. These principles are detailed by W. G. Carrara, R. S. Goodman and R. M. Majewski in *Spotlight Synthetic Radar*, Boston, Artech House, 1995, incorporated herein in its entirety by reference.

Thus, the accuracy of the motion compensation for phase coherence applied to each radar A/D sample is critical to SAR imaging. Typically, an inertial navigation system (INS) using accelerometers and gyroscopes derives velocity, acceleration and position information for use in radar motion compensation. The INS is updated from various sources, such as satellite based Global Positioning Systems (GPS) or pre-stored geo registered features of the terrain in the vicinity of the path of the moving radar. Using an INS aided by GPS may subject the GPS to jamming, corrupting the GPS signal. Consequently, the GPS jamming may induce a position error that may manifest itself in certain applications as a blurring of SAR images, reducing SAR utility.

Using a plurality of pre-stored geo registered features (position references) instead of GPS updates of the INS requires added memory and interfacing within the radar, increasing parts count and reducing reliability. The concept of using pre-stored geo registered features for increased position accuracy is described in U.S. Pat. No. 5,485,384, titled On Board Navigation System For An Aerial Craft Including a Synthetic Aperture Sideways Looking Radar issued Jan. 16, 1996 to B. Falconnet and U.S. Pat. No. 5,432,520 titled SAR/GPS Inertial Method of Range Measurement, issued Jul. 11, 1995 to Schneider et al., both incorporated herein in their entirety by reference. An alternative to using pre-stored geo registered features is thus desirable to avoid generating an accurate geo registered feature database, updating it, and interfacing it to a sensor, such as a radar system.

SUMMARY OF THE INVENTION

The need for geo-registered features is avoided and above limitations reduced by a system for estimating a motion of a first sensor during a time interval, said system comprising a second sensor, said first sensor and said second sensor sensing the same geo-location during said time interval. The first sensor computes a first target location error from sensing the geo-location. The second sensor also computing a second target location error from sensing the same geo-location. A data link interconnects the first sensor and the second sensor, the data link transmitting the second target location error computed by the second sensor to the first sensor during the time interval. A processor at said first sensor combines the first target location error and the second target location error in a first sensor observation model, where the sensor observation model is descriptive of the motion of the first sensor. The observation model is used with a Kalman filter to update the position of the first sensor.

The geo-location is not pre-registered, nor known in advance.

BRIEF DESCRIPTION OF THE DRAWING

In the Drawing:

FIG. 1 is a sensor location system of the prior art where the absence of GPS positioning information is compensated for by determining sensor location with respect to geo registered feature(s) using a SAR, or FLIR sensor of the geo-registered feature;

FIG. 1A is a Kalman filter configuration of the prior art using the structure of FIG. 1 to update the position of a sensor;

DETAILED DESCRIPTION OF THE INVENTION

Figure 2:
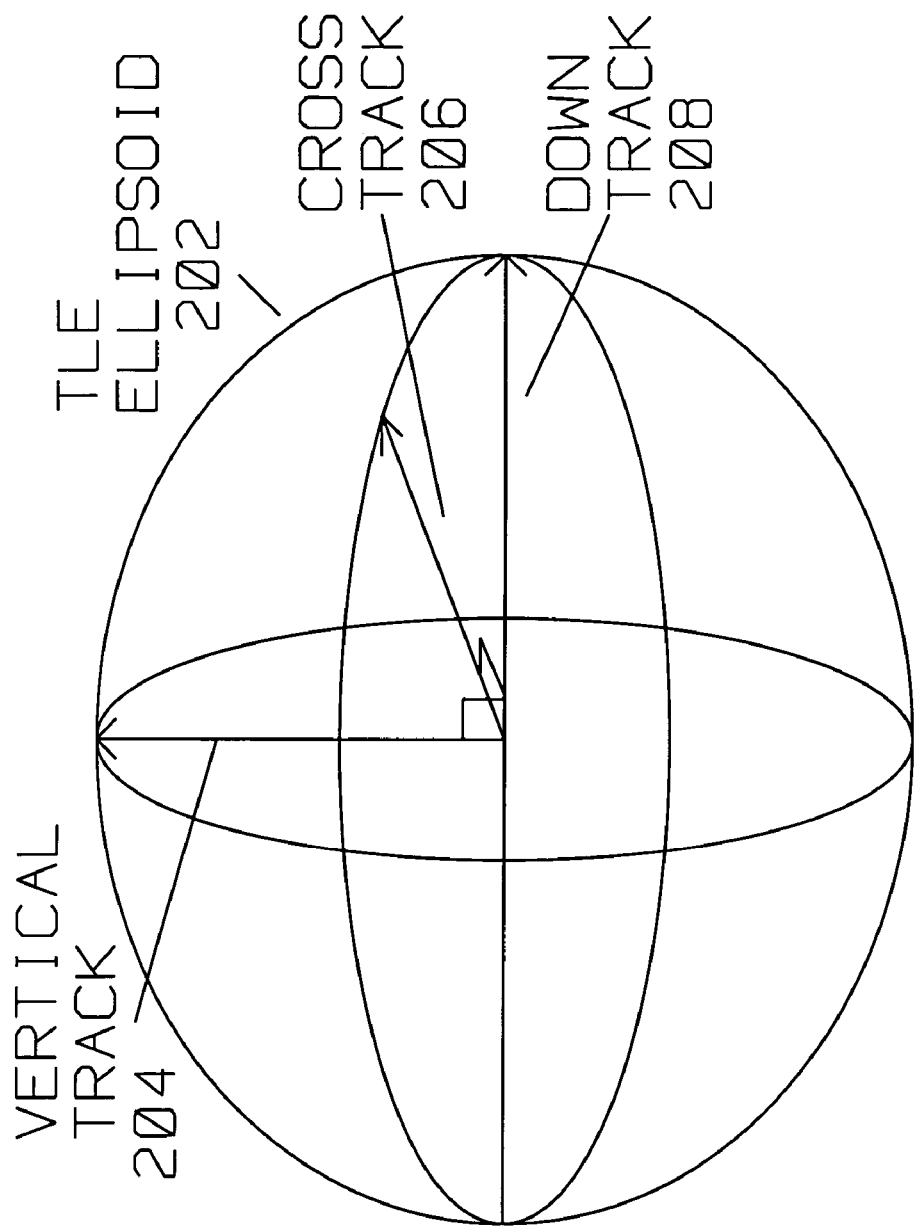
FIG. 2 shows a target location error (TLE) ellipsoid typical of the output from a Kalman filter using a single sensor.

The present disclosure describes a method and apparatus for geo-locating the position of a sensor when Global Positioning Satellite (GPS) transmission is jammed, or unavailable. Instead of using GPS, the position of the sensor is computed by combining a plurality of TLEs derived from sensing a geo-location by a plurality of sensors. The TLEs thus derived are transmitted using a data link from independent sensors motion measurements, where the sensors may be separated in space and not co-located. The geo-location is not known in advance, nor is it pre-registered.

As shown in FIG. 1, in the prior art, sensor motion is initially measured by an inertial measurement unit 110. The output from inertial measurement unit 110 is used by inertial navigation system processor 106 to update a Kalman filter 102 in conjunction with GPS signal from processor 108 within INS/GPS integrator 100. If however, GPS jamming detector 104 determines that the GPS signal is jammed or unavailable, then guidance process 118 directs a SAR/FLIR sensor 116 to perform location measurements on a geo-registered feature 120. The output from SAR/FLIR sensor 116 is examined in image processor 114 and compared with contents of Catalog of Registered Features 112. Position of SAR/FLIR sensor 116 is extracted from data provided from image processor 114 in Extract Position 118. This yields the position of sensor 116 with respect to the geo-registered feature 120. The position of SAR/FLIR sensor 116 thus derived from image processor 114 and Extract Position 118 is used within Kalman filter 102 to augment inertial navigation information, instead of the unavailable GPS information. The limitation of this prior art approach is that a catalog of geo registered features 112 has to exist for SAR/FLIR processor sensor 116 for its current geographical position.

The motion of sensor 116 (position, velocity and acceleration) is updated and projected by a motion navigator. An example of a motion navigator used with this disclosure is the classical Kalman filter, (Kalman and Bucy, 1960) well known in the art, and described by A. Gelb in *Applied Optimal Estimation,* 1974, The Analytic Science Corporation, The MIT Press, incorporated herein in its entirety by reference. The function of the motion navigator in this disclosure, exemplified by the Kalman filter, is to (optimally) predict the position, velocity and acceleration of a platform containing a sensor at known time intervals between inputs from a position sensor, such as, for example, a Synthetic Aperture Radar (SAR), Forward Looking Infrared (FLIR), and/or SONAR.

As shown in FIG. 1A, further detailing FIG. 1, the estimation of motion is made from a position sensor generating input data 101 at time t=1. SAR/FLIR position sensor 116 measures position during an update time interval, and presents results at the end of the time interval. The Kalman filter evaluates changes in position measured by the position sensor over many previous intervals to estimate future motion, or trajectory of the sensor during the next measuring interval.

Continuing with FIG. 1A, in computing the estimation of sensor motion within a Kalman filter, an error covariance matrix 103 is computed along with an observation model 105, typically made up of the Observation Matrix $H_k$ and Measurement Noise Matrix $R_k$. Based on the observation model, optimal gains for particular parameters are computed in Compute Optimal Gains $K_k$ 107 and used by Update Sensor Position and Filter Parameters 111. The cycle is repeated during the next time interval, t=2.

The input data is presented to the Kalman filter, described by the Gelb reference above, and described as follows:

$$\vec{x}_k = \Phi_{k-1}\vec{x}_{k-1} + \vec{w}_{k-1}, \; \vec{w}_k \sim N(\vec{0}, Q_k)$$

$$\vec{z}_k = H_k\vec{x}_k + \vec{v}_k, \; \vec{v}_k \sim N(\vec{0}, R_k)$$

$$E[\vec{x}(0)] = \vec{x}_0, \; E[\vec{x}_0\vec{x}_0^T] = P_0, \; E[\vec{w}_j\vec{v}_k^T] = \vec{0} \; \forall j,k$$

$$P_k^- = \Phi_{k-1}P_{k-1}^+\Phi_{k-1}^T + Q_{k-1}$$

$$P_k^+ = (I - K_k H_k)P_k^-$$

$$K_k = P_k^- H_k^T [H_k P_k^- H_k^T + R_k]^{-1} \quad \text{Equation 1}$$

where $\Phi_k$ is the transition matrix for interval k.

The error covariance propagation matrix $P_k^+$ 103, Kalman filter gain $K_k$ 107, measurement model 105 (observation matrix $H_k$, and observation noise matrix $R_k$) are shown in FIG. 1A.

A typical target location error (TLE) ellipsoid 202 derived from computations in FIG. 1 and FIG. 1A is shown in FIG. 2. The TLE is due to uncertainty in the position of the sensor (or its associated platform), with respect to a coordinate system. Thus, the TLE represents an error independent of sensor capabilities or accuracy in detecting or tracking a target. There are three perpendicular quantities that define the extent of a TLE: vertical track 204, cross track 206 and down-track 208 error.

Equation 1 depends on only one sensor (or platform) to derive target location and update the trajectory estimation of the target from data at t=1 to be used for the time interval k until the next update at t=2.

In contrast, this disclosure derives an improved (measurement) noise matrix $R_k$ and an observation matrix $H_k$ for use within a sensor navigator, e.g. Kalman filter. This disclosure combines a plurality of independent common geo-location measuring sensors (independent sources of a target location), each having its own independent TLE for overall measurement. The combination of TLEs provide a more accurate estimate of target position as compared to any one of the contributing sensors. That is, a plurality of measurements from individual, independent sensors on separate, or the same platform(s), are combined to obtain a lower, new TLE. The new TLE is of higher accuracy, lesser extent, lesser volume, as compared to the TLE from any one of the sensors used to form the combined, new TLE. In some applications, the more accurate TLE obtained from combining observation models from SAR and/or FLIR sensors avoids the need for the inclusion of geo-registered features in target location computations. The same concept may be applied to sonar in an ocean environment.

Reducing Target Location Errors (TLE).

Errors in computed target geo-location using a single platform can be primarily attributed to three major sources:

sensor position errors
sensor bearing errors and
Digital Terrain Elevation Data (DTED) errors.

For this disclosure, above three errors are being treated as being statistically independent, i.e. fully de-correlated, and have a zero mean Gaussian distribution. Other errors, not cited, are assumed insignificantly small compared to the above three errors, and thus are not considered. It is further assumed that the target to be tracked is acquired, that is, its position is detected at time intervals used to compute its new position during the next time interval. DTED noise is treated as part of the measurement noise in the Z direction using the Earth Center Earth Fixed (ECEF) coordinate frame.

Errors in a target position sensor directly transform to the slant coordinate frame. These errors are converted into the platform coordinate system using the angle ψ described in the parent application.

As detailed in the parent application, the slant plane consists of vectors $\vec{V}_D$ and $\vec{R}$. The slant coordinate frame is defined by:

$x_s$ is along the vehicle velocity axis $\vec{V}$;
$z_s$ is perpendicular to the slant plane;
$y_s$ forms a right hand coordinate system with $x_s$ and $z_s$.

The platform coordinate frame (sensor body coordinate frame) is defined by:

$x_p$ is sensor (vehicle) velocity direction;
$y_p$ is sensor (vehicle) right wing;
$z_p$ forms a right hand coordinate system with $x_p$ and $y_p$.

The relationship between the slant coordinate frame and the platform coordinate system is given by:

$$dx_p = \Delta \vec{r} \cdot \left( \frac{\vec{V}}{V} + \frac{\vec{R}}{R} \cdot \cos\phi \right) + \frac{\Delta \vec{V}}{V} \cdot \vec{R} \cdot \cos\phi$$

$$dy_p = \left( \frac{\Delta \vec{r}}{R} + \frac{\Delta \vec{V}}{V} \right) \cdot \vec{R} \cdot \sin\phi \cdot \cos\psi - \Delta \vec{r} \cdot \frac{\vec{V} \times \vec{R}}{|\vec{V} \times \vec{R}|} \cdot \sin\psi$$

$$dz_p = \left( \frac{\Delta \vec{r}}{R} + \frac{\Delta \vec{V}}{V} \right) \cdot \vec{R} \cdot \sin\phi \cdot \sin\psi - \Delta \vec{r} \cdot \frac{\vec{V} \times \vec{R}}{|\vec{V} \times \vec{R}|} \cdot \cos\psi$$

where $$\psi = \tan^{-1} \frac{R_z}{\sqrt{R_x^2 + R_y^2}}$$

$$\frac{\vec{R}}{R} = (R_x, R_y, R_z)$$

and $\Delta\vec{r}$ and $\Delta\vec{V}$ are the vectors of the vehicle navigation position and velocity errors, respectively, in the body coordinate frame.

$\vec{V}$ is the velocity vector of the sensor platform (vehicle);

$\vec{R}$ is the range vector between the vehicle position and a geo-location; and $\phi$ is the angle between the sensor platform (vehicle) flight path and the line of sight between the sensor platform (vehicle) and the geo-location sensed by a plurality of sensors.

$\vec{r}$ and $\Delta\vec{V}$ are the first six Kalman filter error states defined as $$\Delta \vec{r} = (\delta r_x, \delta r_y, \delta r_z)^T$$

and $$\Delta \vec{V} = (\delta V_x, \delta V_y, \delta V_z)^T$$

in the platform coordinate frame and subscript T denotes the transpose of the vector.

If $\Delta\vec{r}$ and $\Delta\vec{V}$ are defined in the ECEF coordinate frame, then these error states are transformed into the platform reference frame where the error equations are defined. The Kalman filter error states $\vec{x}_k$, observation matrix $H_k$ and measurement noise matrix $R_k$ are defined as:

$$\vec{x}_k = (\delta r_x, \delta r_y, \delta r_z, \delta V_x, \delta V_y, \delta V_z, 0, \ldots, 0)^T,$$

$$H_k = \begin{pmatrix} h_{00}, h_{01}, h_{02}, h_{03}, h_{04}, h_{05}, 0, \ldots, 0 \\ h_{10}, h_{11}, h_{12}, h_{13}, h_{14}, h_{15}, 0, \ldots, 0 \\ h_{20}, h_{21}, h_{22}, h_{23}, h_{24}, h_{25}, 0, \ldots, 0 \end{pmatrix},$$

$$\text{and } R_k = \begin{pmatrix} r_{00}, & 0, & 0 \\ 0, & r_{11}, & 0 \\ 0, & 0, & r_{22} \end{pmatrix}$$

Assume that the vectors $$\frac{\vec{R}}{R} = (R_x, R_y, R_z), V = |\vec{V}|$$

$$R = |\vec{R}|, \frac{\vec{V}}{V} = (p_x, p_y, p_z)$$

and $$\frac{\vec{V}}{V} \times \frac{\vec{R}}{R} = (q_x, q_y, q_z)$$

Therefore, the target location error (TLE), as derived in the parent application can be written in the following form:

$$dx_p = (p_x + R_x \cdot \cos\phi)\delta r_x +$$
$$(p_y + R_y \cdot \cos\phi)\delta r_y + (p_z + R_z \cdot \cos\phi)\delta r_z + [R_x \cdot \cos\phi \cdot R/V]$$
$$\delta V_x + [R_y \cdot \cos\phi \cdot R/V]\delta V_y + [R_z \cdot \sin\phi \cdot R/v]\delta V_z$$
$$dy_p = (R_x \cdot \sin\phi \cdot \cos\psi - q_x \cdot \sin\psi)\delta r_x + (R_y \cdot \sin\phi \cdot \cos\psi - q_y \cdot \sin\psi)\delta r_y +$$
$$(R_z \cdot \sin\phi \cdot \cos\psi - q_z \cdot \sin\psi)\delta r_z + [R_x \cdot \sin\phi \cdot \cos\psi \cdot R/V]\delta$$
$$V_x + [R_y \cdot \sin\phi \cdot \cos\psi \cdot R/V]\delta V_y + [R_z \cdot \sin\phi \cdot \cos\psi \cdot R/V]\delta V_z$$
$$dz_p = (R_x \cdot \sin\phi \cdot \sin\psi - q_x \cdot \cos\psi)\delta r_x + (R_y \cdot \sin\phi \cdot \sin\psi - q_y \cdot \cos\psi)\delta r_y +$$
$$(R_z \cdot \sin\phi \cdot \sin\psi + q_z \cdot \cos\psi)\delta r_z + [R_x \cdot \sin\phi \cdot \sin\psi \cdot R/V]\delta$$
$$V_x + [R_y \cdot \sin\phi \cdot \sin\psi \cdot R/V]\delta V_y + [R_z \cdot \sin\phi \cdot \sin\psi \cdot R/V]\delta V_z$$

Note that the $dx_p$ (down-track), $dy_p$ (cross-track), and $dz_p$ vertical track components form an ellipsoid of TLE.

The following observation matrix is applicable,

Equation 2

$h_{00} = p_x + R_x \cdot \cos\phi$ $h_{01} = p_y + R_y \cdot \cos\phi$ $h_{02} = p_z + R_z \cdot \cos\phi$ $h_{03} = R_x \cdot \cos\phi \cdot R/V$ $h_{04} = R_y \cdot \cos\phi \cdot R/V$ $h_{05} = R_z \cdot \cos\phi \cdot R/V$ $h_{10} = R_x \cdot \sin\phi \cdot \cos\psi - q_x \cdot \sin\psi$ $h_{11} = R_y \cdot \sin\phi \cdot \cos\psi - q_y \cdot \sin\psi$ $h_{12} = R_z \cdot \sin\phi \cdot \cos\psi - q_z \cdot \sin\psi$ $h_{13} = R_x \cdot \sin\phi \cdot \cos\psi \cdot R/V$ $h_{14} = R_y \cdot \sin\phi \cdot \cos\psi \cdot R/V$ $h_{15} = R_z \cdot \sin\phi \cdot \cos\psi \cdot R/V$ $h_{20} = R_x \cdot \sin\phi \cdot \sin\psi + q_x \cdot \cos\psi$ $h_{21} = R_y \cdot \sin\phi \cdot \sin\psi + q_y \cdot \cos\psi$ $h_{22} = R_z \cdot \sin\phi \cdot \sin\psi + q_z \cdot \cos\psi$ $h_{23} = R_x \cdot \sin\phi \cdot \sin\psi \cdot R/V$ $h_{24} = R_y \cdot \sin\phi \cdot \sin\psi \cdot R/V$ $h_{25} = R_z \cdot \sin\phi \cdot \sin\psi \cdot R/V$ Equation 2

Now the measurement noise is derived. The measurement noises are determined by the TLE of each platform. An example of the measurement noise matrix is described using a two dimensional observation model and two sensors, followed by more general scenarios.

It is assumed that all the sensors (platforms) in each scenario are in a common time frame, observing the same geolocation (target(s)), and sharing navigation information instantaneously via a data link system. The scenarios considered are examples of the teachings herein, and are as follows.

Case I. Platform 0 is Updated from Sensor Platforms i Where i=1, 2, ... n−1 a. Platform 0 is updated from platform 1 with two dimensional measurement noise matrix.
b. Platform 0 is updated from Platform 1 with three dimensional noise matrix.
c. Platform 0 is updated from all other platforms i where i=1, 2 ... n−1 with three dimensional measurement noise matrix.

Case II. Platform i is Updated from Other Platforms j,(≠i), Where i, j=0, 1 ... n−1

Case Ia Embodiment

Platform 0 is updated from Platform 1 with two dimensional measurement noise matrix.

In this case Platform 1 has higher navigation accuracy than that of Platform 0. The navigation accuracy of Platform 0 is updated with independent observations (target measurements), separate and distinct from those obtained in Platform 1 via the data link system. The error state vector, the observation matrix and the measurement noise matrices of the Kalman filter for Platform 0 are:

$$\vec{x}_k = (\delta r_x, \delta r_y, \delta r_z, \delta V_x, \delta V_y, \delta V_z, 0, \ldots, 0)^T,$$

$$H_k = \begin{pmatrix} h_{00}, h_{01}, h_{02}, h_{03}, h_{04}, h_{05}, 0, \ldots, 0 \\ h_{10}, h_{11}, h_{12}, h_{13}, h_{14}, h_{15}, 0, \ldots, 0 \end{pmatrix} \text{ and}$$

$$R_k = \begin{pmatrix} r_{00} & 0 \\ 0 & r_{11} \end{pmatrix}$$

Figure 5:
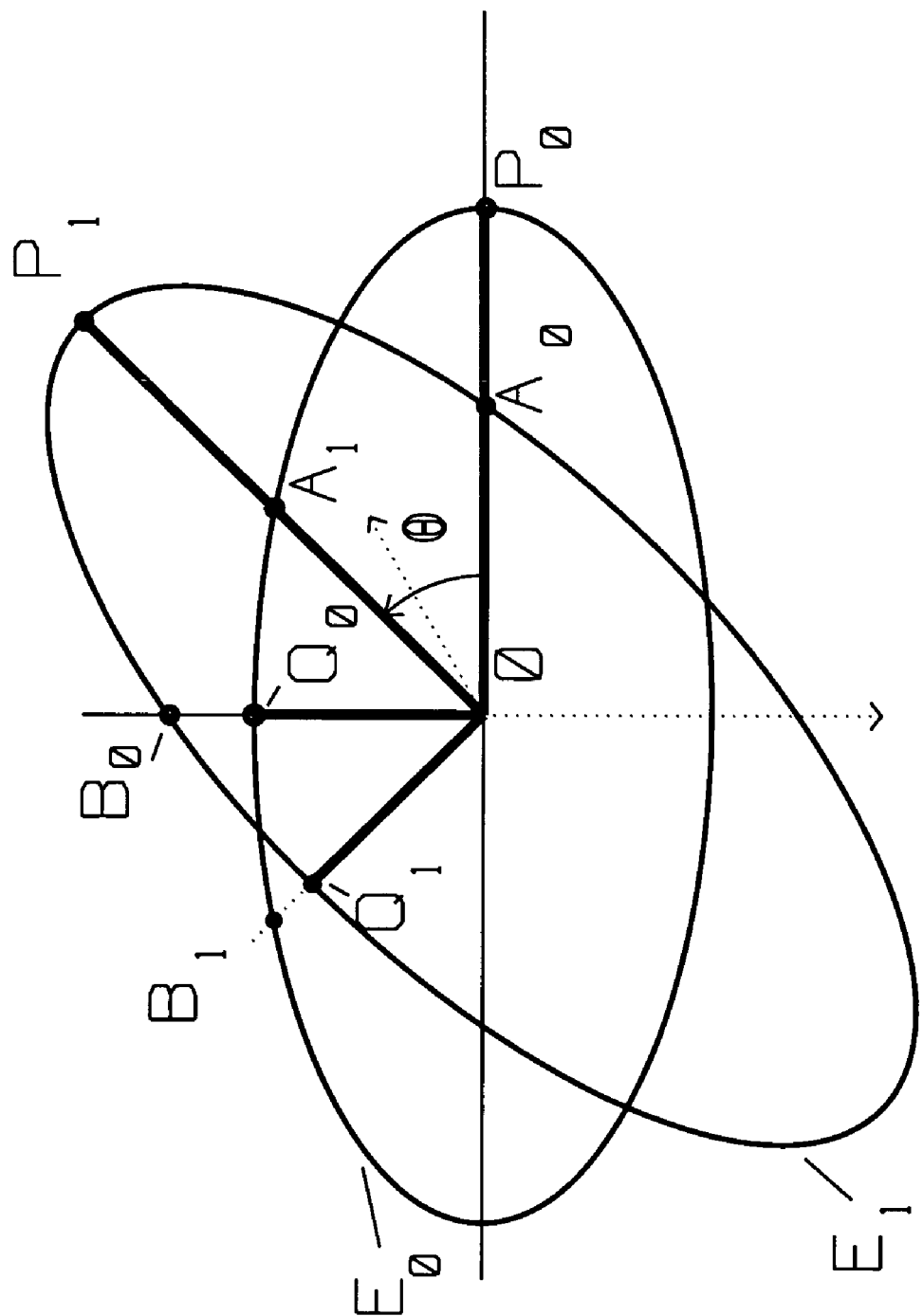
FIG. 5 shows the combination of two TLEs, from sensor 1 ($E_1$) and TLE from sensor 0 ($E_0$)

The derivation of $r_{00}$ and $r_{11}$ is shown in FIG. 5. In FIG. 5, the lengths $OP_0$ (denoted as $a_0$) is the down track error while $OQ_0$ (denoted as $b_0$) is the cross track error of the TLE obtained from platform 0. The lengths $OP_1$ (denoted as $a_1$) is the down track error while $OQ_1$ (denoted as $b_1$) is the cross track error of the TLE obtained from platform 1. The TLE for platform 0 (namely $E_0$) is an ellipsoid which is formed by the semi-major axis $a_0$ and semi minor axis $b_0$ Similarly, the TLE for platform 1 (namely $E_1$) is an ellipsoid which is formed by the semi-major axis $a_1$ and semi minor axis $b_1$.

Since platform 0 can obtain the TLE information from platform 1, the intersection of these two ellipsoids, $E_0 \cap E_1$, becomes a more accurate TLE for platform 0. Therefore, for platform 1, the down track error $a_1$ will be reduced to $r_{DR1}$, the length of $OA_1$. Similarly, for platform 0, the down track error $a_0$ will be reduced to $r_{DR0}$, the length of $OA_0$. This information is used to update and to bind the navigation errors for platform 0. The minimum of $r_{DR0}$ and $a_1$ is the standard deviation of the measurement noise for the down-track. Similarly, the minimum of $r_{CR0}$ and $b_1$ is the standard deviation of the measurement noise for the down-track. The two dimensional measurement noise matrix of the Kalman filter for platform 0 is as follows:

$$R_k = \begin{pmatrix} r_{00} & r_{01} \\ r_{10} & r_{11} \end{pmatrix}; r_{01} = r_{10} = 0, r_{00} = r_{D01}, r_{11} = r_{C01}$$

where $r_{D01} \stackrel{denote}{=} \min\{a_0, r_{DR1}\}$ and $r_{C01} \stackrel{denote}{=} \min\{b_0, r_{CR1}\}$.

Now, we will derive $r_{DR0}$ and $r_{CR}$. The length of $OA_0$ and $OA_1$ can be computed as follows.

Let us denote $a_0 = DR_0 =$ length of $\overline{OP_0}$ $b_0 = CR_0 =$ length of $\overline{OQ_0}$ $a_1 = DR_1 =$ length of $\overline{OP_1}$ $b_1 = CR_1 =$ length of $\overline{OQ_1}$ The general two-dimensional elliptic equation is $$r^2 = \frac{a^2 b^2}{b^2 \cos^2\theta + a^2 \sin^2\theta}$$

Thus, $$r_{DR1} = \text{Length of } \overline{OA_0} = \sqrt{\frac{a_1^2 b_1^2}{b_1^2 \cos^2\theta + a_1^2 \sin^2\theta}}$$

$$r_{CR1} = \text{Length of } \overline{OB_0} = \sqrt{\frac{a_1^2 b_1^2}{b_1^2 \sin^2\theta + a_1^2 \cos^2\theta}}$$

$$r_{DR0} = \text{Length of } \overline{OA_1} = \sqrt{\frac{a_0^2 b_0^2}{b_0^2 \cos^2\theta + a_0^2 \sin^2\theta}}$$

$$r_{CR0} = \text{Length of } \overline{OB_1} = \sqrt{\frac{a_0^2 b_0^2}{b_0^2 \sin^2\theta + a_0^2 \cos^2\theta}}$$

where $$\cos\theta = \frac{\vec{V}_{H0}}{|\vec{V}_{H0}|} \cdot \frac{\vec{V}_{H1}}{|\vec{V}_{H1}|}$$

$\sin^2\theta = 1 - \cos^2\theta$, $\vec{V}_{H0} = (V_{x0}, V_{y0}, 0)$, and $\vec{V}_{H1} = (V_{x1}, V_{y1}, 0)$ For platform 0 and platform i, the general forms for $r_{DRi}$ and $r_{CRi}$ are denoted as $$r_{DRi} = \text{Length of } \overline{OA_0} = \sqrt{\frac{a_i^2 b_i^2}{b_i^2 \cos^2\theta + a_i^2 \sin^2\theta}}$$

$$r_{CRi} = \text{Length of } \overline{OB_0} = \sqrt{\frac{a_i^2 b_i^2}{b_i^2 \sin^2\theta + a_i^2 \cos^2\theta}}$$

where $$\cos\theta = \frac{\vec{V}_{H0}}{|\vec{V}_{H0}|} \cdot \frac{\vec{V}_{Hi}}{|\vec{V}_{Hi}|}$$

$\sin^2\theta = 1 - \cos^2\theta$,

-continued $$\vec{V}_{H0} = (V_{x0}, V_{y0}, 0),$$

and $$\vec{V}_{Hi} = (V_{x1}, V_{y1}, 0)$$

$V_{x0}$ and $V_{y0}$ are the x and y component of the vehicle velocity for platform 0. $V_{xi}$ and $V_{yi}$ are the x and y component of the vehicle velocity for platform i.

$V_{H0}$ and $V_{Hi}$ are the magnitudes of vectors $\vec{V}_{H0}$ and $\vec{V}_{Hi}$ respectively. $\theta$ is the angle between the semi-major axes of platform 0 and i.

Case Ib

We will choose the down-track and vertical-track of the TLE as two dimensional elliptic axes. Thus $b_1$=cross-track $c_1$=vertical-track The general elliptic equation for two dimension is $$r^2 = \frac{b^2 c^2}{c^2 \cos^2\theta + b^2 \sin^2\theta}$$

$$r_{VR1} = \sqrt{\frac{b_1^2 c_1^2}{c_1^2 \cos^2\theta + b_1^2 \sin^2\theta}}$$

where $$\cos\theta = \frac{\vec{V}_{H0}}{V_{H0}} \cdot \frac{\vec{V}_{Hi}}{V_{Hi}}$$

$$\sin^2\theta = 1 - \cos^2\theta$$

$$\vec{V}_{H0} = (0, V_{y0}, V_{z0})$$

$$\vec{V}_{Hi} = (0, V_{y1}, V_{z1})$$

Note that we also can obtain $r_{CR1}$ from the above equations. However, this $r_{CR1}$ is the same as $r_{CR1}$ that was derived in Case Ia.

Note that the $r_{VR1}$ can also be derived from the vertical-track and cross-track of the TLE ellipsoid by using the above method.

The $h_{ij}$ (i=0,1,2 j=0,1,3,4,5) are defined in Equation 2 which are derived from the TLE for platform 0.

Case Ic—Platform 0 is Updated from All Other Platforms i (i=1, 2, . . . n−1)

Figure 3:
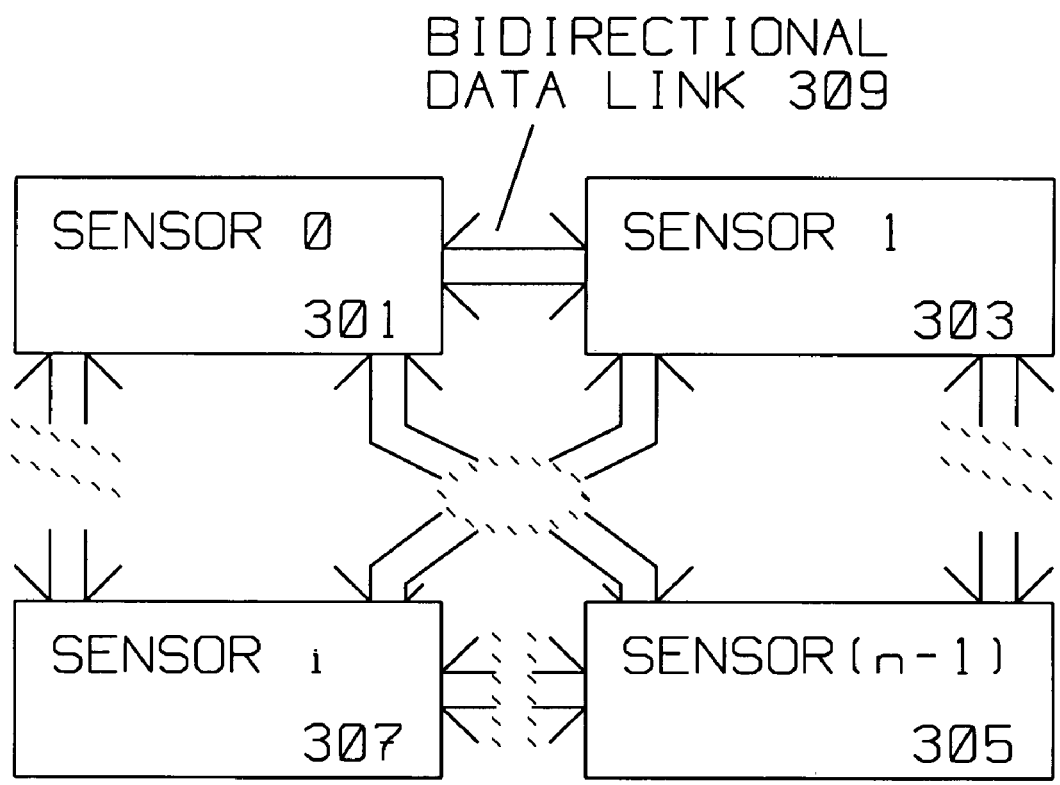
FIG. 3 shows the bidirectional data link between sensors (platforms) enabling transmission of data between sensors.

In one embodiment, as shown in FIG. 3, Sensor 0 301 is connected to all other sensors, sensor 1 303, sensor i 307 and sensor (n−1) 305 using bidirectional data link 309. Sensor 0, an example of a typical sensor, is also described in FIG. 4, as sensor 0, 400. The structure of sensor 0 is applicable to sensor 1 303, sensor i 307 and sensor (n−1) 305. Thus TLEs are exchanged among all platforms for a particular geo-location (target).

For each pair, (0,i), which is platforms 0 and i, compute $r_{CR(i-1)}$, $r_{DR(i-1)}$, and $r_{VR(i-1)}$ from Case Ib above. Thus the H and R matrices can be derived as follows, $$\vec{x}_k = (\delta r_x, \delta r_y, \delta r_z, \delta V_x, \delta V_y, \delta V_z, 0, \ldots, 0)^T,$$

$$H_k = \begin{pmatrix} h_{00}, h_{01}, h_{02}, h_{03}, h_{04}, h_{05}, 0, \ldots, 0 \\ h_{10}, h_{11}, h_{12}, h_{13}, h_{14}, h_{15}, 0, \ldots, 0 \\ h_{20}, h_{21}, h_{22}, h_{23}, h_{24}, h_{25}, 0, \ldots, 0 \end{pmatrix},$$

and $R_k = \begin{pmatrix} r_{00}, & 0, & 0 \\ 0, & r_{11}, & 0 \\ 0, & 0, & r_{22} \end{pmatrix}$ $r_{01} = r_{02} = r_{10} = r_{12} = r_{20} = r_{21} = 0,$ $r_{00} = r_{D01}, r_{11} = r_{C01}, r_{22} = r_{V01}$ where $$r_{D01} \stackrel{denote}{=} \min\{a_0, r_{DR1}, r_{DR2}, \ldots, r_{DR(n-1)}\},$$

$$r_{C01} \stackrel{denote}{=} \min\{b_0, r_{CR1}, r_{CR2}, \ldots, r_{CR(n-1)}\}$$

and $$r_{V01} \stackrel{denote}{=} \min\{c_0, r_{VR1}, r_{VR2}, \ldots, r_{VR(n-1)}\}$$

Case II

Sensor i is updated from other sensors j ($\neq$i) at the same time where j=0, 1, . . . , n-1 for a fixed i where I=0, 1, . . . , n-1. All sensors, including sensor 0, are sensing the same geo-location A, typically a conveniently discernable target.

Figure 4:
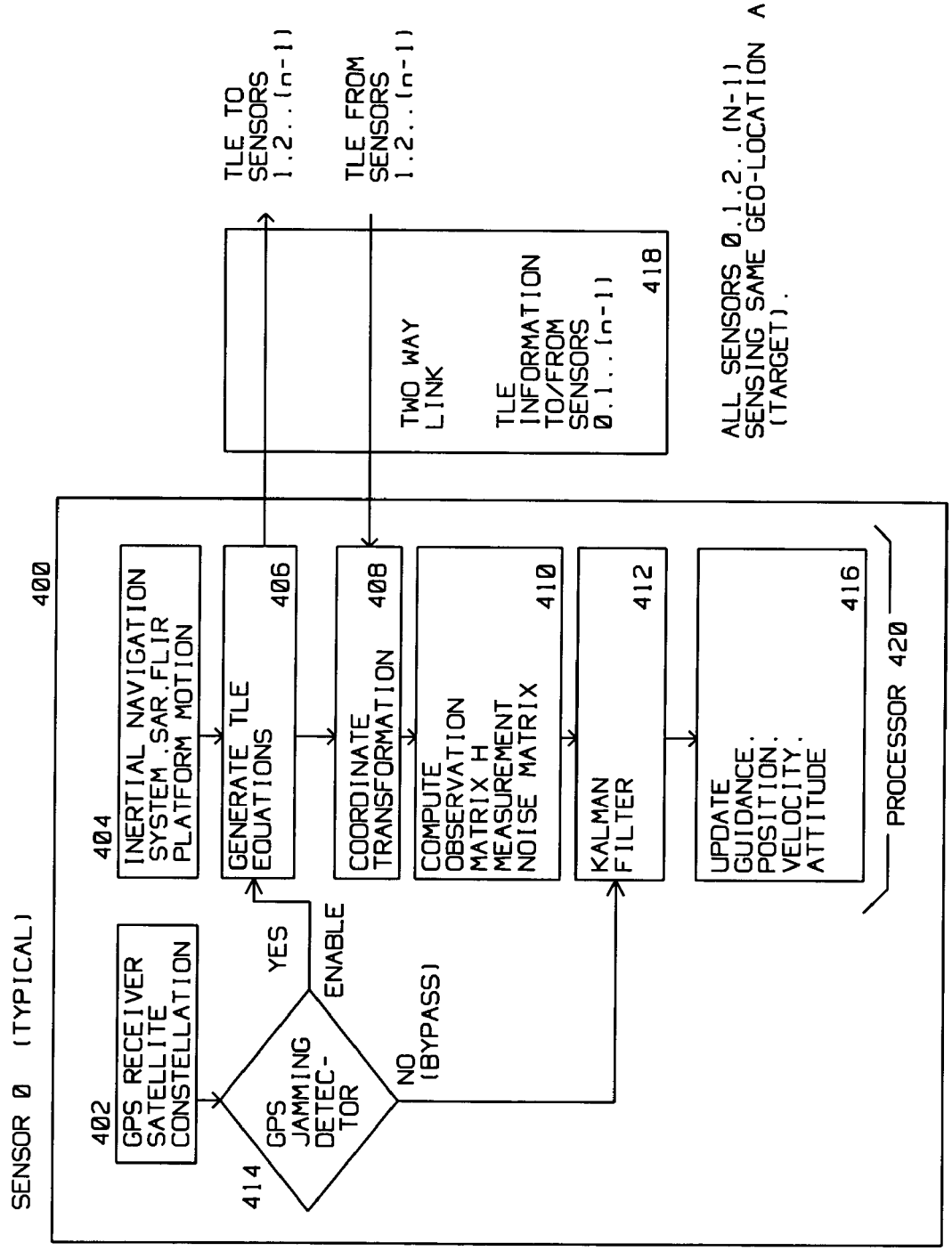
FIG. 4 shows position updating of sensor 0 with TLEs from a plurality of platforms 1, . . . i . . . (n−1) used within the Kalman filter of sensor 0.

This case is illustrated in FIG. 4. Here, sensor 0 400 has a GPS receiver 402 for receiving navigation signals from a constellation of GPS satellites. GPS Jamming Detector 414 detects a jammed or unavailable GPS signal. If the GPS navigation signal is valid, the GPS location information is passed to Kalman filter 412, which in turn supplies position information to Update Guidance Position, Velocity and Attitude 416 within processor 420.

Conversely, if GPS Jamming Detector 414 determines that the GPS signal is unusable, that is, jammed or corrupted, an alternative source of navigation information is activated. Inertial Navigation System SAR, FLIR Platform motion 404 determines the location of a sensor (on a platform) and geo-location A, typically using a SAR or FLIR sensor such as sensor 116 in FIG. 1. Note that geo-location A is not cataloged, nor pre-stored or geo-registered in a data base. Returning to FIG. 4, sensor 400 uses Generates TLE equations 406 to compute its own TLE. These TLE from sensor 0 400 are sent to other sensor (platforms) using two way link 418.

In receiving TLE from other sensors using two way link 418, a coordinate transformation 408 is performed on incoming TLE from sensors 1, 2 . . . (n-1) to match their TLE to the current position of sensor 0 400. This and the data from sensor 0, is input into observation model for sensor 0 400 (Compute Observation Matrix H and Measurement Noise Matrix 410).

The observation matrix H and Measurement Noise Matrix are part of the input into Kalman Filter 412 to substitute for the missing GPS information.

This case is an extension of the Case Ic from sensor (platform) 0 to any sensor (platform) i. In this case, the observation model is as follows.

$$\vec{x}_k = (\delta r_x, \delta r_y, \delta r_z, \delta V_x, \delta V_y, \delta V_z, 0, \ldots, 0)^T,$$

$$H_k = \begin{pmatrix} h_{00}, h_{01}, h_{02}, h_{03}, h_{04}, h_{05}, 0, \ldots, 0 \\ h_{10}, h_{11}, h_{12}, h_{13}, h_{14}, h_{15}, 0, \ldots, 0 \\ h_{20}, h_{21}, h_{22}, h_{23}, h_{24}, h_{25}, 0, \ldots, 0 \end{pmatrix},$$

and $$R_k = \begin{pmatrix} r_{00}, & 0, & 0 \\ 0, & r_{11}, & 0 \\ 0, & 0, & r_{22} \end{pmatrix}$$

$$r_{01} = r_{02} = r_{10} = r_{12} = r_{20} = r_{21} = 0,$$

$$r_{00} = r_{Di1}, r_{11} = r_{Ci1}, r_{22} = r_{Vi1}$$

where $$r_{Di1} \stackrel{denote}{=} \min\{a_i, r_{DR0}, r_{DR1}, \ldots, r_{DR(i-1)}, r_{DR(i+1)}, \ldots r_{DR(n-1)}\},$$

$$r_{Ci1} \stackrel{denote}{=} \min\{a_i, r_{CR1}, r_{CR2}, \ldots, r_{CR(i-1)}, r_{CR(i+1)}, \ldots r_{DR(n-1)}\}$$

and $$r_{Vi1} \stackrel{denote}{=} \min\{a_i, r_{VR1}, r_{VR2}, \ldots, r_{VR(i-1)}, r_{VR(i+1)}, \ldots r_{VR(n-1)}\}$$

Note that the classical Kalman filter has a restriction on the cross-correlation between process (matrix Q in equation 1) and measurement noise (matrix R in equation 1). A modified filter is thus used in this disclosure.

To preserve uncorrelated relationships between observation model and dynamic model in the Kalman filter for platform i, it is necessary to exclude the down track, cross track and vertical track information obtained from Platform i for the computation of $r_{jj}$ and $R_K$ matixes. Thus, the observation model is modified as follows.

$$\vec{x}_k = (\delta r_x, \delta r_y, \delta r_z, \delta V_x, \delta V_y, \delta V_z, 0, \ldots, 0)^T,$$

$$H_k = \begin{pmatrix} h_{00}, h_{01}, h_{02}, h_{03}, h_{04}, h_{05}, 0, \ldots, 0 \\ h_{10}, h_{11}, h_{12}, h_{13}, h_{14}, h_{15}, 0, \ldots, 0 \\ h_{20}, h_{21}, h_{22}, h_{23}, h_{24}, h_{25}, 0, \ldots, 0 \end{pmatrix},$$

and $$R_k = \begin{pmatrix} r_{00}, & 0, & 0 \\ 0, & r_{11}, & 0 \\ 0, & 0, & r_{22} \end{pmatrix}$$

$$r_{01} = r_{02} = r_{10} = r_{12} = r_{20} = r_{21} = 0,$$

$$r_{00} = r_{Di1}, r_{11} = r_{Ci1}, r_{22} = r_{Vi1}$$

where $$r_{Di1} \stackrel{denote}{=} \min\{r_{DR0}, r_{DR1}, \ldots, r_{DR(i-1)}, r_{DR(i+1)}, \ldots, r_{DR(n-1)}\},$$

$$r_{Ci1} \stackrel{denote}{=} \min\{r_{CR0}, r_{CR1}, \ldots, r_{CR(i-1)}, r_{CR(i+1)}, \ldots, r_{CR(n-1)}\}$$

and $$r_{Vi1} \stackrel{denote}{=} \min\{r_{VR0}, r_{VR1}, \ldots, r_{VR(i-1)}, r_{VR(i+1)}, \ldots, r_{VR(n-1)}\}$$

A Typical Method

Figure 6:
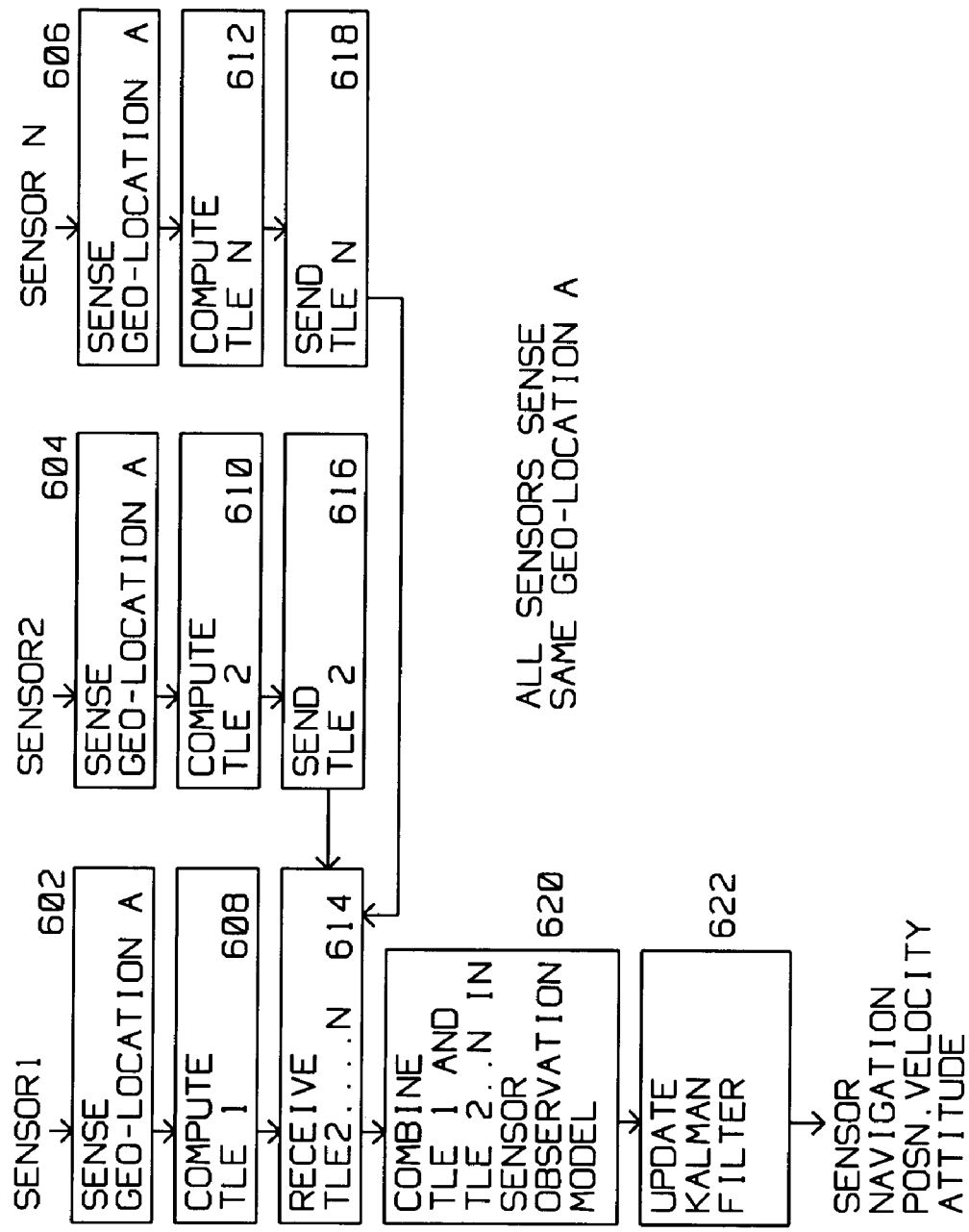
FIG. 6 shows a typical flow diagram of the method used in this disclosure.

As shown in FIG. 6, above analytical analysis describes a method for estimating the motion of a first sensor, typically on a platform, during a time interval, comprising the following steps:

a) sensing a geo location using sense geo-location 602 for the first sensor, sense geo-location 604 for the second sensor, and sense geo-location 606 for the $N^{th}$ sensor during the time interval;

b) computing a first TLE in Compute TLE1 608 using the first sensor, a second TLE in Compute TLE 2 610 using the second sensor; a third TLE in Compute TLE N 612 using the $N^{th}$ sensor;

c) interconnecting the first sensor, the second sensor and the $N^{th}$ sensor using a data link, the data link transmitting the second location error TLE 2 from second sensor2 using Send TLE 2, and the Nth sensor using Send TLE N to the first sensor during said time interval;

e) combining the first target location error (TLE 1) associated with the first sensor the second target location error (TLE 2) and the $N^{th}$ target location errors in a first sensor observation model within Combine TLE 1, and TLE 2 . . . N in Sensor Observation Model 620;

f) Using the combined TLE gained from the combination of TLEs from the second and $N^{th}$ separate, de-correlated measurements within Update Kalman Filter 622 associated with sensor 1, thereby reducing the TLE for sensor 1.

The first, or second sensor, or both, is a synthetic aperture radar, a FLIR infrared sensor, or a SONAR. The only requirement is that the sensor supplying a TLE observe, or take position measurements with respect to the same reference geo-location.

The first sensor and the second sensor sense the geo-location to be used as a reference independently, during the same time interval, or common time frame. It is understood that geo-location sensing can be adjusted in time to insure that reported position observations are synchronized to the exact same time.

Application Example

Above principles are typically applied for the described cases using a 15 error state Kalman filter defined as having 3 position errors, 3 velocity errors, 3 attitude errors, 3 gyro biases, and 3 accelerometer biases. In this example, a typical 1σ error budget is defined as follows:

| | |
|---|---|
| Position errors | 100 meters |
| Velocity errors | 5 meters/sec |
| Attitude errors | 0.5 degrees |
| Accelerometer bias | $400 \times 10^{-6}$ g, g = 9.8 meters/second$^2$ |
| Accelerometer white noise | 0.05 meter/second/$\sqrt{hour}$ |
| Gyroscope bias | 0.7 degrees/hour |
| Gyroscope white noise | 0.05 degrees/$\sqrt{hour}$ |

Using above operating figures, the size of the navigation error using the teachings herein is substantially reduced especially over longer time intervals, as compared to the single sensor case. For example, where GPS measurements are lost and updates are received via the two way data link every 100 seconds from a second sensor over a 1000 second interval, the navigation position error is reduced from about 4000 meters to 200 meters and the velocity error is reduced from 4 meter/sec to about 1 meter/sec.

All references cited in this document are incorporated herein in their entirety by reference.

Although presented in exemplary fashion employing specific embodiments, the disclosed structures are not intended to be so limited. For example, although the target location accuracy improvement herein is described in the context of a radar sensor for target position, the disclosure is also applicable for sonar TLE, or other target locating methods, where a location of a target (or scatterers) is independently determined by a plurality or target measuring platforms, each platform having its own, independent TLE.

Those skilled in the art will also appreciate that numerous changes and modifications could be made to the embodiment described herein without departing in any way from the invention.

The invention claimed is:

1. A system for estimating an independent motion of a first sensor during a time interval, said system comprising:
    a second sensor separated from and not co-located with said first sensor, said first sensor and said second sensor each sensing a same geo-location during said time interval, said first sensor computing a first target location error from sensing said geo-location, said second sensor computing a second target location error from sensing said same geo-location, wherein said same geo-location is remote from and not directly coupled to said first and second sensors and is not pre-registered with nor known in advance by either of said first and second sensors, wherein said first and second sensors have motions independent and different from each other;
    a bidirectional data link interconnecting said first sensor and said second sensor, said bidirectional data link transmitting said second target location error from said second sensor to said first sensor during said time interval;
    a processor arranged at said first sensor and configured to combine at least said first target location error and said second target location error in a first sensor observation model that determines a combined target location error, said first sensor observation model describing and estimating the motion of said first sensor, said combined target location error reducing a target location error associated with the first sensor,
    wherein the system is operable when a Global Positioning Position (GPS) location signal is either jammed or otherwise unavailable to one or more of the first and second sensors.

2. A system as described in claim 1 wherein said first sensor is a synthetic aperture radar.

3. A system as described in claim 1 wherein said first sensor is an infrared sensor.

4. A system as described in claim 1 wherein said first sensor is a sound navigation and ranging (SONAR) sensor.

5. A system as described in claim 1 wherein said first sensor observation model updates a Kalman filter computed by said processor.

6. A system for estimating an independent motion of each sensor of a plurality of at least three spatially separated sensors during a time interval, the system comprising:
    each sensor of said plurality of at least three spatially separated sensors sensing a same geo-location during said time interval and generating an associated target location error for said same geo-location, wherein said same geo-location is remote from and not directly coupled to said plurality of at least three spatially separated sensors and is not pre-registered with nor known in advance by any of said plurality of at least three spatially separated sensors, wherein said plurality of at least three spatially separated have motions independent and different from each other;
    a bidirectional data link interconnecting all sensors of said plurality of at least three spatially separated sensors, said bidirectional data link transmitting said associated target location error from each sensor of said plurality of at least three spatially separated sensors to each of the other sensors of said plurality of at least three spatially separated sensors during said time interval;
    a processor arranged at each sensor of said plurality of at least three spatially separated sensors that combines said target location errors received from said plurality of at least three spatially separated sensors into a combined target location error determined by an associated sensor observation model, said target location errors being received using said bidirectional data link during said time interval, said associated sensor observation model describing and estimating said independent motion of one sensor of the plurality of at least three spatially separated sensors, said combined target location error reducing a target location error associated with said one sensor,
    wherein the system is operable when a Global Positioning Position (GPS) location signal is either jammed or otherwise unavailable to one or more of the plurality of at least three spatially separated sensors.

7. A system as described in claim 6 wherein one or more of each sensor of said plurality of sensors is a synthetic aperture radar.

8. A system as described in claim 6 wherein one or more of each sensor of said plurality of sensors is an infrared sensor.

9. A system as described in claim 6 wherein one or more of each sensor of said plurality of sensors is a sound navigation and ranging (SONAR) sensor.

10. A system as described in claim 6 wherein said associated sensor observation model updates a Kalman filter computed by said processor.

11. A method for estimating an independent motion of a first sensor during a time interval, said method comprising:
    sensing a same geo-location using said first sensor and a second sensor separated from and not co-located with said first sensor during said time interval, wherein said same geo-location is remote from and not directly coupled to said first and second sensors and is not pre-registered with nor known in advance by either of said first and second sensors, wherein the first and second sensors have motions independent and different from each other, and wherein a Global Positioning Position (GPS) location signal is either jammed or otherwise unavailable to one or more of the first and second sensors;
    computing a first target location error using said first sensor;
    computing a second sensor location error using said second sensor;
    interconnecting said first sensor and said second sensor by a bidirectional data link, said bidirectional data link transmitting said second location error from said second sensor to said first sensor during said time interval;
    combining said first target location error and said second target location error in a first sensor observation model that determines a combined target location error, said first sensor observation model describing and estimating the independent motion of said first sensor; and
    reducing the first target location error associated with said first sensor using said combined target location error.

12. A method as described in claim 11 wherein said first sensor is a synthetic aperture radar.

13. A method as described in claim 11 wherein said first sensor is an infrared sensor.

14. A method as described in claim 11 wherein said first sensor is a sound navigation and ranging (SONAR) sensor.

15. A method as described in claim 11 wherein said sensor observation model updates a Kalman filter.

16. The system of claim 1, wherein said first sensor observation model comprises an observation matrix and a measurement noise matrix.

17. The system of claim 1, further comprising a third sensor, said third sensor sensing the geo-location during said time interval, said third sensor computing a third target location error from sensing said geo-location;
wherein the data link interconnects each of said first sensor, said second sensor, and said third sensor, said data link transmitting said third target location error from said third sensor to said first sensor during said time interval,
wherein said processor combines said third target location error in said first sensor observation model to determine said combined target location error so as to further reduce the target location error associated with the first sensor.

18. The system of claim 1, further comprising a plurality of N sensors, wherein N is greater than two, wherein each of said N sensors sense the geo-location during said time interval and compute an associated target location error that is linked to at least the first sensor via the data link.

19. The method of claim 11, further comprising:
computing a third sensor location error associated with a third sensor;
interconnecting said first sensor, said second sensor, and said third sensor using the data link, said data link transmitting said third location error from said third sensor to at least said first sensor during said time interval; and
combining said first target location error and said third target location error in the first sensor observation model to determine said combined target location error, wherein said combined target location error further reduces the target location error associated with the first sensor.

20. The method of claim 11, further comprising computing N sensor location errors associated with N sensors, wherein N is greater than 2; and linking the computed N sensor location errors to at least the first sensor via the data link.

21. The method of claim 11, wherein said combining said first target location error and said second target location error in a first sensor observation model provides an estimated target position that is more accurate than target positions associated with either of said first and said second sensors.

22. The system of claim 1, wherein said combined target location error provides an estimated target position that is more accurate than target positions associated with either of said first and said second sensors.

23. The system of claim 6, wherein said combined target location error provides an estimated target position that is more accurate than target positions associated with any one of the at least three spatially separated sensors.

24. The system of claim 6, wherein each sensor of a plurality of at least three spatially separated sensors is interconnected to each other sensor of the at least three spatially separated sensors via the bidirectional data link.

* * * * *